United States Patent
Arimitsu

(10) Patent No.: US 7,233,093 B2
(45) Date of Patent: Jun. 19, 2007

(54) ELECTRIC ROTATING MACHINE

(75) Inventor: Minoru Arimitsu, Kanagawa (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 273 days.

(21) Appl. No.: 11/001,091

(22) Filed: Dec. 2, 2004

(65) Prior Publication Data

US 2005/0127778 A1 Jun. 16, 2005

(30) Foreign Application Priority Data

Dec. 15, 2003 (JP) ............................. 2003-416578

(51) Int. Cl.
*H02K 1/22* (2006.01)
(52) U.S. Cl. .................... 310/266; 310/112; 310/114
(58) Field of Classification Search ............. 310/266, 310/112–114
See application file for complete search history.

(56) References Cited

U.S. PATENT DOCUMENTS 3,308,318 A * 3/1967 Dunaiski et al. ............ 310/114
6,373,160 B1 * 4/2002 Schrodl ...................... 310/114
6,639,337 B1 10/2003 Nakano

FOREIGN PATENT DOCUMENTS

| EP | 1330020 A2 | 7/2003 |
| JP | 2001-103717 A | 4/2001 |
| WO | WO 03/084029 A1 | 10/2003 |

* cited by examiner

*Primary Examiner*—Dang Le
(74) *Attorney, Agent, or Firm*—Foley & Lardner LLP

(57) ABSTRACT

An electric rotating machine, including a stator including circumferentially arranged stator teeth, inner and outer rotors disposed coaxially with the stator inside and outside thereof, an inner armature coil group including a plurality of inner armature coils wound on the stator teeth on a side of the inner rotor, the inner armature coil group being energized to drive the inner rotor, and an outer armature coil group including a plurality of outer armature coils wound on the stator teeth on a side of the outer rotor, the outer armature coil group being energized to drive the outer rotor. The inner and outer armature coil groups have electric connections between the inner armature coils and between the outer armature coils so as to prevent occurrence of magnetic interference between the inner and outer armature coil groups, respectively.

15 Claims, 5 Drawing Sheets

ELECTRIC ROTATING MACHINE

BACKGROUND OF THE INVENTION

The present invention relates to an electric rotating machine including a stator and inner and outer rotors disposed inside and outside the stator, respectively.

Japanese Patent Application First Publication No. 2001-103717 (corresponding to U.S. Pat. No. 6,639,337) discloses an electric rotating machine including a stator having a plurality of circumferentially arranged stator teeth with armature coils, an inner rotor coaxially disposed inside the stator, an outer rotor coaxially disposed outside the stator, and an inverter connected to the stator. The inner and outer rotors are independently driven by supplying a composite current to the armature coils of the stator.

SUMMARY OF THE INVENTION

In such an electric rotating machine of the above-described related art, there are the following problems due to supplying the composite current to the coils of the stator: (1) ratio of inducible effective power to inherent capacity (kVA) of the inverter is 57% at the minimum, which requires the use of a relatively large power supply; (2) peak current becomes larger and current variation, i.e., di/dt, increases, whereby performance of a power device relative to voltage must be enhanced, which causes increase in cost; and (3) the optimal numbers of ampere turns for the inner and outer rotors cannot be individually set, causing cost increase as a whole.

It is an object of the present invention to provide an electric rotating machine capable of improving utilization ratio of a power supply, reducing peak current, achieving optimal construction of the respective coils for the inner and outer rotors, and serving for reducing the cost, while retaining the similar composite magnetic field generated in stator teeth by the conventional composite current.

In one aspect of the present invention, there is provided an electric rotating machine comprising:

a stator including a plurality of circumferentially arranged stator teeth;

an inner rotor disposed coaxially with the stator inside thereof;

an outer rotor disposed coaxially with the stator outside thereof;

an inner armature coil group including a plurality of inner armature coils wound on the stator teeth on a side of the inner rotor, the inner armature coil group being energized to drive the inner rotor; and an outer armature coil group including a plurality of outer armature coils wound on the stator teeth on a side of the outer rotor, the outer armature coil group being energized to drive the outer rotor;

the inner armature coil group and the outer armature coil group having electric connections between the plurality of inner armature coils and between the plurality of outer armature coils so as to prevent occurrence of magnetic interference between the inner armature coil group and the outer armature coil group, respectively.

DETAILED DESCRIPTION OF THE INVENTION

Figure 1:
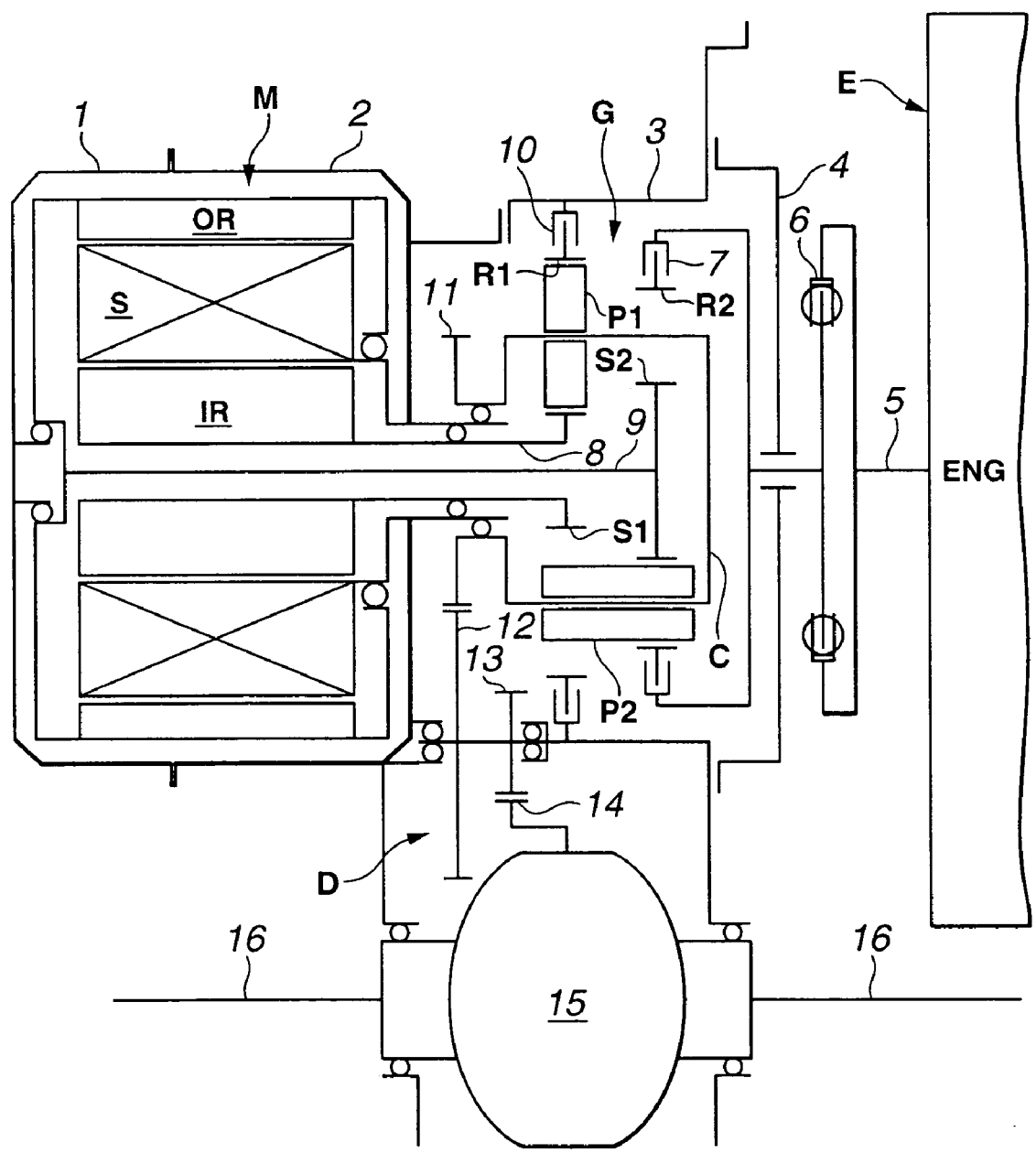
FIG. 1 is a schematic diagram illustrating a hybrid drive unit to which a multi-shaft multilayer motor is applied.

Referring to FIG. 1, there is shown a hybrid drive unit including a multi-shaft multilayer motor to which an electric rotating machine of an embodiment of the present invention as explained later can be suitably applied. As illustrated in FIG. 1, the hybrid drive unit includes engine E, multi-shaft multilayer motor M, Ravigneaux compound planetary gear train G and drive output mechanism D. Reference numerals 1, 2, 3 and 4 denote a motor cover, a motor case, a gear housing and a front cover, respectively. Engine E acts as a primary power source of the hybrid drive unit and has engine output shaft 5. Engine output shaft 5 is connected with second ring gear R2 of Ravigneaux compound planetary gear train G via rotational fluctuation absorbing damper 6 and multiple disk clutch 7.

Multi-shaft multilayer motor M is one unit in appearance and a subsidiary power source functioning as two motor/generators. Multi-shaft multilayer motor M includes stator S, inner rotor IR disposed inside stator S and outer rotor OR disposed outside stator S. Stator S is fixed to motor case 2 and acts as a stationary armature with coils. Each of inner rotor IR and outer rotor OR has permanent magnets mounted to an interior thereof. Stator S, inner rotor IR and outer rotor OR are coaxially arranged to form a three-layered structure. First hollow motor shaft 8 is fixed to inner rotor IR and connected to first sun gear S1 of Ravigneaux compound planetary gear train G. Second motor shaft 9 is fixed to outer rotor OR and connected to second sun gear S2 of Ravigneaux compound planetary gear train G.

Ravigneaux compound planetary gear train G has a function of continuously varying a gear ratio by controlling respective rotational speed of two motors. Ravigneaux compound planetary gear train G includes common planetary carrier C carrying first pinion P1 and second pinion P2 meshing with each other, first sun gear S1 meshing with first pinion P1, second sun gear S2 meshing with second pinion P2, first ring gear R1 meshing with first pinion P1, and second ring gear R2 meshing with second pinion P2. Multiple disk brake 10 is disposed between first ring gear R1 and gear housing 3. Common planetary carrier C is connected with output gear 11.

Drive output mechanism D includes output gear 11, first counter gear 12, second counter gear 13, drive gear 14, differential 15 and drive shaft 16. Output rotation and output torque from output gear 11 are transmitted to drive shaft 16, 16 and driving wheels, not shown, via first counter gear 12, second counter gear 13, drive gear 14 and differential 15.

Thus, the hybrid drive unit is constructed by connecting engine output shaft 5 and second ring gear R2 of Ravigneaux compound planetary gear train G, connecting first sun gear S1 of Ravigneaux compound planetary gear train G and first hollow motor shaft 8, connecting second sun gear S2 of Ravigneaux compound planetary gear train G and second motor shaft 9, and connecting common planetary carrier C of Ravigneaux compound planetary gear train G and output gear 11.

Figure 2:
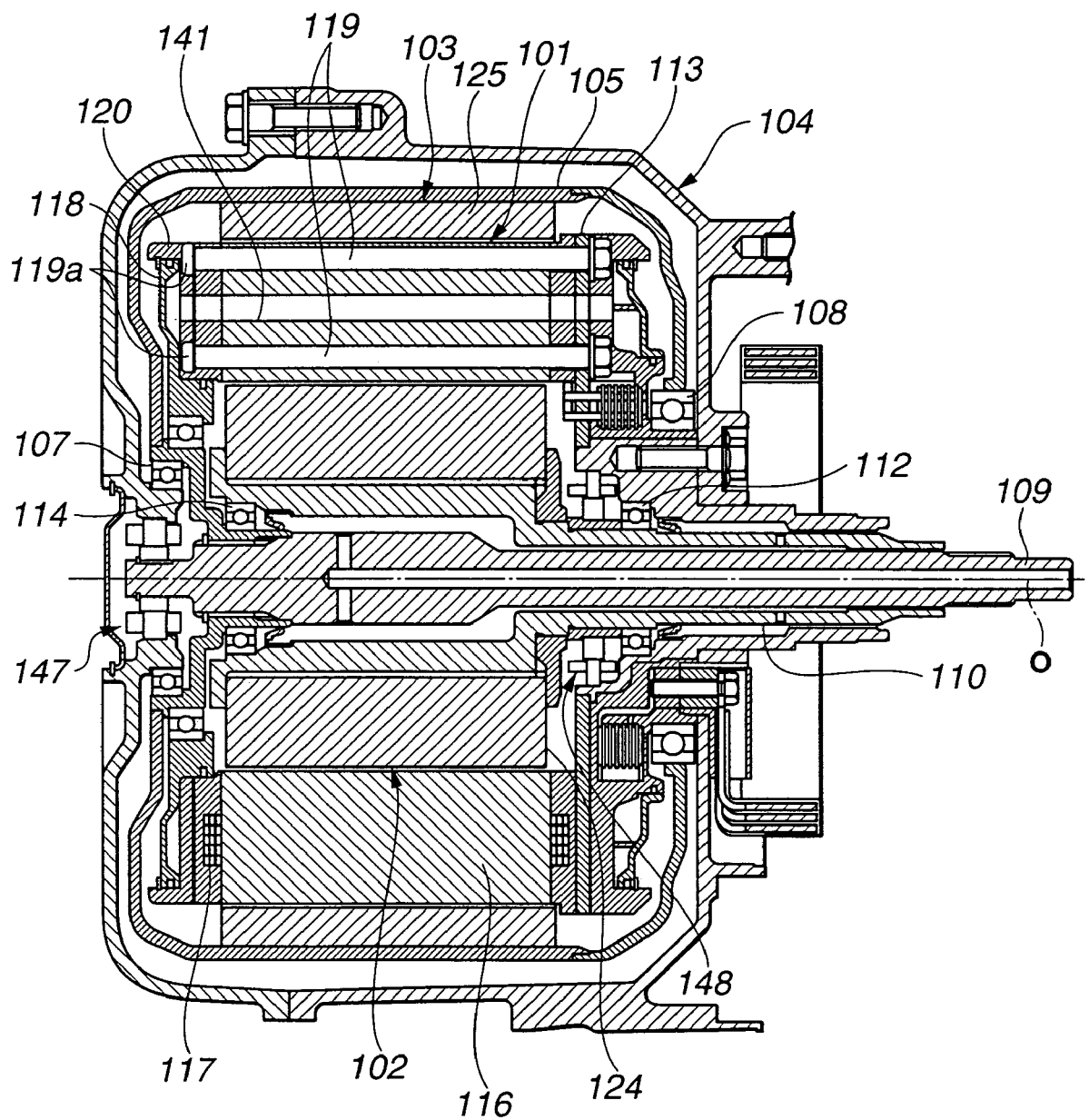
FIG. 2 is a longitudinal section of a multi-shaft multilayer motor of a vehicular hybrid transmission, to which an electric rotating machine according to the present invention, of an embodiment is applicable.

Referring to FIG. 2, there is shown a multi-shaft multilayer motor constituting a vehicular hybrid transmission in combination with a Ravigneaux compound planetary gear train. The electric rotating machine of the embodiment of the present invention is applicable to the multi-shaft multilayer motor. As illustrated in FIG. 2, the multi-shaft multilayer motor has a triple-layer structure including one annular stator 101, inner rotor 102 and outer rotor 103 which are coaxially disposed. Inner and outer rotors 102 and 103 are disposed on a radial inside of stator 101 and a radial outside thereof, respectively, and independently rotatable about rotation axis O. Stator 101, inner rotor 102 and outer rotor 103 are accommodated within housing 104.

Inner rotor 102 includes lamination core 124 formed by laminating a plurality of electromagnetic steel sheets in an axial direction of inner rotor 102. Each of the electromagnetic steel sheets is formed by press molding. Inner rotor 102 further includes a plurality of permanent magnets extending through lamination core 124 in the axial direction of inner rotor 102. The permanent magnets are arranged in an equidistantly spaced relation in a circumferential direction of inner rotor 102. Outer rotor 103 includes lamination core 125 having the same construction as that of lamination core 124 of inner rotor 102, and a plurality of permanent magnets that extend through lamination core 125 in the axial direction of outer rotor 103 and are arranged in the same manner as those of inner rotor 102. The number of pole pairs of inner rotor 102 and the number of pole pairs of outer rotor 103 are different from each other by changing the number of magnetic poles that are arranged in inner rotor 102 and outer rotor 103. Specifically, the number of permanent magnets of each of inner and outer rotors 102 and 103 is the same, twelve in this embodiment. Inner rotor 102 has three pole pairs in which each magnetic pole is formed by two permanent magnets. On the other hand, outer rotor 103 has six pole pairs in which each magnetic pole is formed by one permanent magnet.

Thus-constructed outer rotor 103 is accommodated within housing 104 such that an outer circumferential surface of lamination core 125 is drivingly connected to torque transmission shell 105. Torque transmission shell 105 has opposed axial ends rotatably supported to housing 104 by means of bearings 107 and 108. Torque transmission shell 105 is connected with outer rotor shaft 109 on a side of bearing 107. Outer rotor shaft 109 rotatably extends through hollow inner rotor shaft 110 of inner rotor 102.

Inner rotor shaft 110 extends through a central portion of lamination core 124 of inner rotor 102 so as to be drivingly connected with lamination core 124. An axially middle portion of inner rotor shaft 110 is rotatably supported within stationary stator bracket 113 by bearing 112. One end portion, a left side as viewed in FIG. 2, of inner rotor shaft 110 is rotatably supported on an axial end wall of torque transmission shell 105 by bearing 114.

Stator 101 includes a plurality of stator teeth laminated in an axial direction of stator 101. Each of the stator teeth is made of an electromagnetic steel sheet and formed into a T-shape by press molding. Armature coil 117 is wound on a middle portion of the stator teeth which is disposed between an inner yoke and an outer yoke of each of the stator teeth. The stator teeth with armature coil 117 are arranged in a circumferentially equidistantly spaced relation to form a generally ring-shaped stator core. The stator core is supported between brackets 113 and 118 opposed to each other in the axial direction of stator 101 by means of bolts 119. The whole stator core is resin-molded to form an integral body of stator 101. Coolant passage 141 extends within resin-molding 120 in the axial direction of stator 101 through adjacent stator teeth 116. Bolts 119 are disposed radially inside and outside coolant passage 141. Each of bolts 119 is tighten by nut 119a screwed thereon. This tightening structure using bolt 119 and nut 119a may be replaced by riveting.

The multi-shaft multilayer motor is driven by supplying a composite current to armature coil 117 of stator 101. The composite current is composed of two electric currents having different phases corresponding to rotational positions of inner and outer rotors 102 and 103, namely, positions of the permanent magnets of inner and outer rotors 102 and 103, which are detected by rotation angle sensors 147 and 148, respectively. Upon supplying the composite current to armature coil 117, stator 101 generates two rotating magnetic fields respectively exerted to inner and outer rotors 102 and 103, so that inner and outer rotors 102 and 103 are independently driven in synchronism with the respective rotating magnetic fields.

Figure 3:
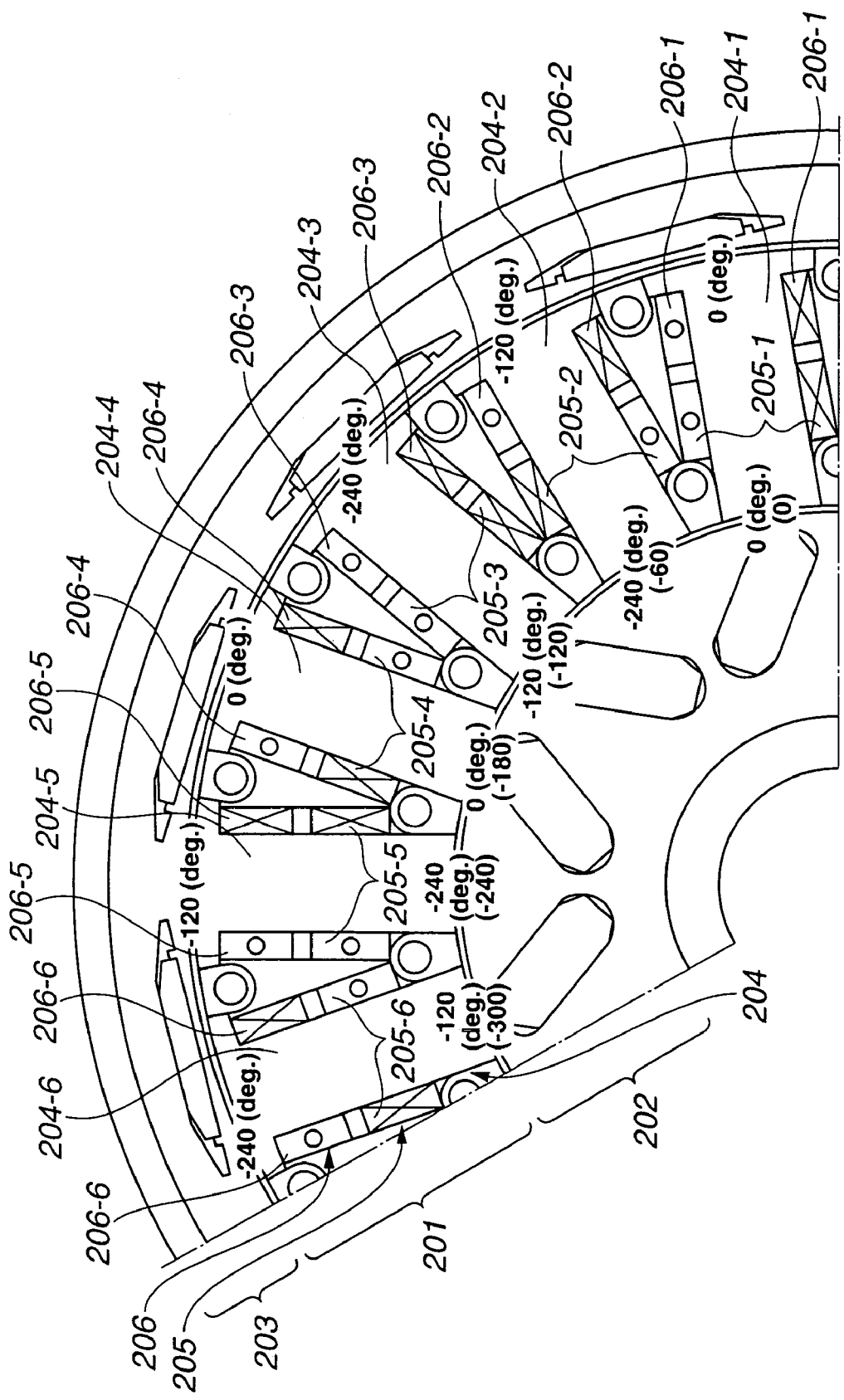
FIG. 3 is an explanatory diagram illustrating a part of the electric rotating machine according to an embodiment of the present invention.

Referring to FIG. 3, the electric rotating machine of the embodiment of the present invention is explained, which is suitably applied to the multi-shaft multilayer motor as described above. The electric rotating machine of the embodiment includes stator 201, inner rotor 202 disposed inside stator 201 and outer rotor 203 disposed outside stator 201. In this embodiment, inner rotor 202 has three pole pairs, and outer rotor 203 has six pole pairs. Stator 201 has eighteen slots that are formed in stator teeth 204 and accommodate two groups 205 and 206 of armature coils for respectively driving inner and outer rotors 202 and 203. FIG. 3 illustrates a one-third model of the electric rotating machine of the embodiment as viewed in the circumferential direction of stator 201 and inner and outer rotors 202 and 203.

As illustrated in FIG. 3, stator 201 includes a plurality of stator teeth 204 including stator teeth 204-1, 204-2, 204-3, 204-4, 204-5 and 204-6. Stator teeth 204 carry inner armature coil group 205 on a side of inner rotor 202 and outer armature coil group 206 on a side of outer rotor 203. Inner armature coil group 205 includes inner armature coils 205-1, 205-2, 205-3, 205-4, 205-5 and 205-6 which are wound on the inner rotor side portions of stator teeth 204-1, 204-2, 204-3, 204-4, 204-5 and 204-6, respectively. Outer armature coil group 206 includes outer armature coils 206-1, 206-2, 206-3, 206-4, 206-5 and 206-6 which are wound on the outer rotor side portions of stator teeth 204-1, 204-2, 204-3, 204-4, 204-5 and 204-6, respectively. Inner rotor 202 is driven by energizing only inner armature coil group 205, and outer rotor 203 is driven by energizing only outer armature coil group 206. A polyphase alternating current, in this embodiment, a three-phase alternating current, is supplied to each of inner armature coil group 205 and outer armature coil group 206.

Outer rotor 203 has the six pole pairs. Outer armature coils 206-1 to 206-6 of outer armature coil group 206 are arranged to have electrical angle of 120° between the adjacent two thereof. Namely, when outer armature coil 206-1 has electrical angle of 0° as a reference, outer armature coils 206-2 and 206-3 have electrical angles of 120° and 240°, respectively. Outer armature coils 206-1 to 206-6 are wound on corresponding stator teeth 204-1 to 204-6 in the same winding direction. Inner rotor 202 has the three pole pairs. Inner armature coils 205-1 to 205-6 of inner armature coil group 205 are arranged to have electrical angle of 60° between the adjacent two thereof. Specifically, when inner armature coil 205-1 has electrical angle of 0° as a reference, inner armature coils 205-2, 205-3, 205-4, 205-5 and 205-6 have electrical angles of 60°, 120°, 180°, 240° and 30°, respectively. Inner armature coils 205-1, 205-3 and 205-5 are wound on corresponding stator teeth 204-1, 204-3 and 204-5 in the same direction. On the other hand, inner armature coils 205-2, 205-4 and 205-6 are wound on corresponding stator teeth 204-2, 204-4 and 204-6 in the same direction that is reversed to the winding direction of inner armature coils 205-1, 205-3 and 205-5. Namely, in inner armature coil group 205, inner armature coils 205-1, 205-3 and 205-5 wound in one direction and inner armature coils 205-2, 205-4 and 205-6 wound in the opposite direction are circumferentially alternately arranged. Each of inner armature coils 205-1 to 205-6 may have the number of turns larger than that of each of outer armature coils 206-1 to 206-6.

Figure 4:
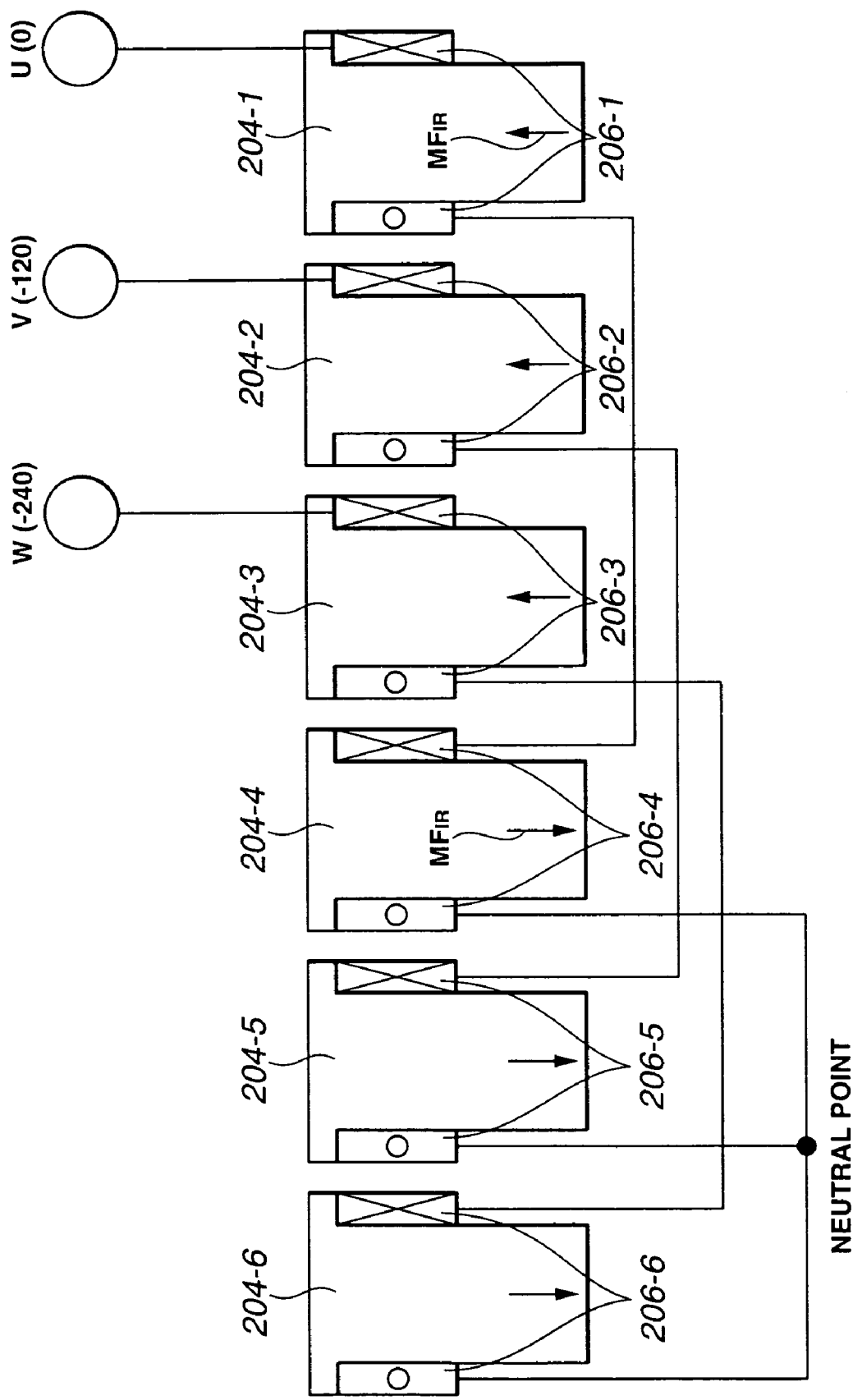
FIG. 4 is an electric connection diagram of an outer armature coil group of the electric rotating machine shown in FIG. 3.

Inner armature coil group 205 and outer armature coil group 206 have electric connections between inner armature coils 205-1 to 205-6 and between outer armature coils 206-1 to 206-6 so as to prevent occurrence of magnetic interference between inner armature coil group 205 and outer armature coil group 206, respectively. FIG. 4 illustrates the electric connection between outer armature coils 206-1 to 206-6 of outer armature coil group 206 as shown in FIG. 3. As illustrated in FIG. 4, U-phase (0-degree phase) current, V-phase (120-degree phase) current and W-phase (240-degree phase) current of the three-phase alternating current are supplied to outer armature coils 206-1, 206-2 and 206-3, respectively. Outer armature coils 206-1, 206-2 and 206-3 are in turn arranged in a counterclockwise direction to make electrical angle of 120° between the adjacent two thereof as shown in FIG. 3. As shown in FIG. 4, outer armature coils 206-1, 206-2 and 206-3 are connected with outer armature coils 206-4, 206-5 and 206-6 in series, respectively. Therefore, outer armature coil 206-4 connected with outer armature coil 206-1 is supplied with the U-phase current. Outer armature coil 206-5 connected with outer armature coil 206-2 is supplied with the V-phase current. Outer armature coil 206-6 connected with outer armature coil 206-3 is supplied with the W-phase current. Outer armature coils 206-4, 206-5 and 206-6 are connected with each other at a neutral point. In the electric connection of outer armature coils 206-1 to 206-6 of outer armature coil group 206, the three pairs of outer armature coils, namely, 206-1 and 206-4, 206-2 and 206-5, and 206-3 and 206-6, which are different by 360° in electrical angle from each other, are connected with each other to be supplied with the same phase current, namely, the U-phase current, the V-phase current and the W-phase current, of the three-phase current.

Figure 5:
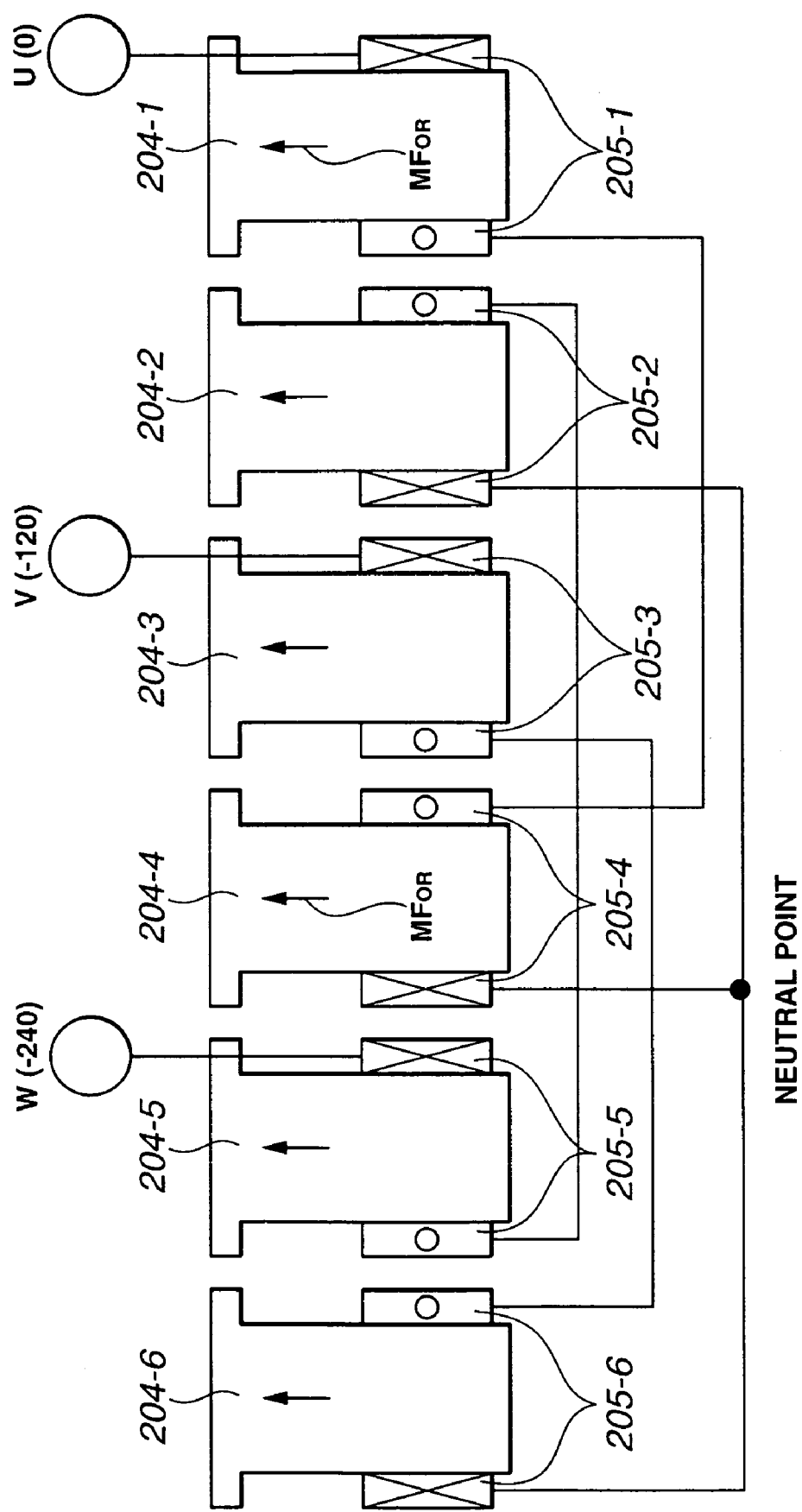
FIG. 5 is an electric connection diagram of an inner armature coil group of the electric rotating machine shown in FIG. 3.

FIG. 5 illustrates the electric connection between inner armature coils 205-1 to 205-6 of inner armature coil group 205 as shown in FIG. 3. As illustrated in FIG. 5, U-phase (0-degree phase) current, V-phase (120-degree phase) current and W-phase (240-degree phase) current of the three-phase alternating current are supplied to inner armature coils 205-1, 205-3 and 205-5, respectively. As shown in FIG. 5, inner armature coils 205-1, 205-3 and 205-5 are connected with inner armature coils 205-4, 205-6 and 205-2, respectively. Therefore, inner armature coil 205-4 connected with inner armature coil 205-1 is supplied with the U-phase current. Inner armature coil 205-6 connected with inner armature coil 205-3 is supplied with the V-phase current. Inner armature coil 205-2 connected with inner armature coil 205-5 is supplied with the W-phase current. Inner armature coils 205-4, 205-6 and 205-2 are connected with each other at a neutral point.

In the electric connection of inner armature coils 205-1 to 205-6 of inner armature coil group 205, the three pairs of inner armature coils, namely, 205-1 and 205-4, 205-3 and 205-6, and 205-5 and 205-2, which are different by 180° in electrical angle from each other, are connected with each other to be supplied with the same phase current, namely, the U-phase current, the V-phase current and the W-phase current, of the three-phase current. Specifically, inner armature coil 205-1 having the electrical angle of 0° is connected with inner armature coil 205-4 having the electrical angle of 180°. Inner armature coil 205-3 having the electrical angle of 120° is connected with inner armature coil 205-6 having the electrical angle of 300°. Inner armature coil 205-5 having the electrical angle of 240° is connected with inner armature coil 205-2 having the electrical angle of 60°. Thus, inner armature coils 205-1 and 205-4 are different by 180° in electrical angle from each other. Similarly, inner armature coils 205-3 and 205-6 are different by 180° in electrical angle from each other. Inner armature coils 205-5 and 205-2 are different by 180° in electrical angle from each other.

When inner armature coil group 205 is energized by supplying the three-phase alternating current thereto, magnetic flux generated in each of inner armature coils 205-1 to 205-6 passes through the corresponding one of outer armature coils 206-1 to 206-6 of outer armature coil group 206 as indicated by arrow $MF_{IR}$ in FIG. 4. At this time, voltage is induced by the magnetic flux generated in each of inner armature coils 205-1 to 205-6, in each of outer armature coils 206-1 to 206-6. A direction of the voltage induced by the magnetic flux of inner armature coil 205-1 in outer armature coil 206-1 is reverse to a direction of the voltage induced by the magnetic flux of inner armature coil 205-4 in outer armature coil 206-4. Therefore, the voltages induced by the magnetic fluxes of inner armature coils 205-1 and 205-4 in outer armature coils 206-1 and 206-4 are cancelled. Similarly, a direction of the voltage induced by the magnetic flux of inner armature coil 205-2 in outer armature coil 206-2 is reverse to a direction of the voltage induced by the magnetic flux of inner armature coil 205-5 in outer armature coil 206-5. The voltages induced by the magnetic fluxes of inner armature coils 205-2 and 205-5 in outer armature coils 206-2 and 206-5 are cancelled. A direction of the voltage induced by the magnetic flux of inner armature coil 205-3 in outer armature coil 206-3 is reverse to a direction of the voltage induced by the magnetic flux of inner armature coil 205-6 in outer armature coil 206-6. The voltages induced by the magnetic fluxes of inner armature coils 205-3 and 205-6 in outer armature coils 206-3 and 206-6 are cancelled.

When outer armature coil group 206 is energized by supplying the three-phase alternating current thereto, magnetic flux generated in each of outer armature coils 206-1 to 206-6 passes through the corresponding one of inner armature coils 205-1 to 205-6 of inner armature coil group 205 as indicated by arrow $MF_{OR}$ in FIG. 5. At this time, voltage is induced by the magnetic flux generated in each of outer armature coils 206-1 to 206-6, in each of inner armature coils 205-1 to 205-6. The winding direction of inner armature coil 205-1 and the winding direction of inner armature coil 205-4 connected with inner armature coil 205-1 are reverse to each other. As a result, a direction of the voltage induced by the magnetic flux of outer armature coil 206-1 in inner armature coil 205-1 and a direction of the voltage induced by the magnetic flux of outer armature coil 206-4 in inner armature coil 205-4 become reverse to each other. The voltages induced by the magnetic fluxes of outer armature coils 206-1 and 206-4 in inner armature coils 205-1 and 205-4 are cancelled. Similarly, the winding direction of inner armature coil 205-3 and the winding direction of inner armature coil 205-6 are reverse to each other. Directions of the voltages induced by the magnetic fluxes of outer armature coils 206-3 and 206-6 in inner armature coils 205-3 and 205-6 become reverse to each other. The voltages induced by the magnetic fluxes of outer armature coils 206-3 and 206-6 in inner armature coils 205-3 and 205-6 are cancelled. The winding direction of inner armature coil 205-2 and the winding direction of inner armature coil 205-5 are reverse to each other. Directions of the voltages induced by the magnetic fluxes of outer armature coils 206-2 and 206-5 in inner armature coils 205-2 and 205-5 become reverse to each other. The voltages induced by the magnetic fluxes of outer armature coils 206-2 and 206-5 in inner armature coils 205-2 and 205-5 are cancelled.

Since outer armature coils 206-1 to 206-6 of outer armature coil group 206 and inner armature coils 205-1 to 205-6 of inner armature coil group 205 have the respective electric connections as described above, outer armature coil group 206 and inner armature coil group 205 can be prevented from magnetically interfering with each other. Further, in a case where two three-phase inverters are used, inner rotor 202 and outer rotor 203 can be independently driven to generate torque. In such a case, the number of power devices can be reduced to a minimum, and utilization ratio of voltage can be increased to a maximum.

Further, since inner armature coil group 205 and outer armature coil group 206 are separately provided on stator teeth 204 as described above, the optimal number of ampere turns for inner rotor 202 and that for outer rotor 203 can be individually set. This serves for reducing an amount of magnets of inner rotor 202 which tends to be increased in a case where the number of ampere turns of inner armature coil group 205 is the same as that of outer armature coil group 206. For instance, if the number of ampere turns of inner armature coil group 205 is set greater than that of outer armature coil group 206, the amount of magnets of inner rotor 202 can be reduced. This serves for cost-saving.

The electric rotating machine of the present invention can retain the similar composite magnetic field generated in the stator teeth by the conventional composite current. In addition, the electric rotating machine of the present invention can improve utilization ratio (kVA) of a power supply, reduce peak current, achieve optimal construction of the respective coils for the inner and outer rotors, and serve for reducing the cost.

This application is based on a prior Japanese Patent Application No. 2003-416578 filed on Dec. 15, 2003. The entire contents of the Japanese Patent Application No. 2003-416578 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. An electric rotating machine, comprising:
a stator including a plurality of circumferentially arranged stator teeth;
an inner rotor disposed coaxially with the stator inside thereof;
an outer rotor disposed coaxially with the stator outside thereof;
an inner armature coil group including a plurality of inner armature coils wound on the stator teeth on a side of the inner rotor, the inner armature coil group being energized to drive the inner rotor; and
an outer armature coil group including a plurality of outer armature coils wound on the stator teeth on a side of the outer rotor, the outer armature coil group being energized to drive the outer rotor;
the inner armature coil group and the outer armature coil group having electric connections between the plurality of inner armature coils and between the plurality of outer armature coils so as to prevent occurrence of magnetic interference between the inner armature coil group and the outer armature coil group, respectively,
wherein the plurality of outer armature coils include a plurality of pairs of outer armature coils wound in a same direction, each pair of outer armature coils being connected with each other and supplied with a same phase current, the plurality of inner armature coils including a plurality of pairs of inner armature coils wound in directions reverse to each other, each pair of inner armature coils being connected with each other and supplied with a same phase current.

2. The electric rotating machine as claimed in claim 1, wherein the outer armature coil group has an electric connection in which a direction of voltage induced in one of the plurality of outer armature coils by magnetic flux generated in one of the plurality of inner armature coils is reverse to a direction of the voltage induced in another of the plurality of outer armature coils which is connected with the one of the plurality of outer armature coils, by magnetic flux generated in another of the plurality of inner armature coils which is connected with the one of the plurality of inner armature coils, and wherein the inner armature coil group has an electric connection in which a direction of voltage induced in the one of the plurality of inner armature coils by magnetic flux generated in the one of the plurality of outer armature coils is reverse to a direction of the voltage induced in the another of the plurality of inner armature coils which is connected with the one of the plurality of inner armature coils, by magnetic flux generated in the another of the plurality of outer armature coils which is connected with the one of the plurality of outer armature coils.

3. The electric rotating machine as claimed in claim 1, wherein the outer rotor has a number of magnetic poles two times that of the inner rotor, and each pair of inner armature coils being different by 180° in electrical angle from each other.

4. The electric rotating machine as claimed in claim 1, wherein the inner rotor has three pole pairs and the outer rotor has six pole pairs.

5. The electric rotating machine as claimed in claim 4, further comprising two three-phase inverters for independently driving the inner rotor and the outer rotor.

6. The electric rotating machine as claimed in claim 1, wherein each of the plurality of inner armature coils has a number of turns larger than that of each of the plurality of outer armature coils.

7. The electric rotating machine as claimed in claim 1, wherein the plurality of inner armature coils and the plurality of outer armature coils are supplied with a polyphase alternating current, respectively.

8. The electric rotating machine as claimed in claim 1, wherein the plurality of inner armature coils and the plurality of outer armature coils are supplied with a three-phase alternating current, respectively.

9. An electric rotating machine, comprising:
a stator including a plurality of circumferentially arranged stator teeth;
an inner rotor disposed coaxially with the stator inside thereof;
an outer rotor disposed coaxially with the stator outside thereof;
an inner armature coil group including a plurality of inner armature coils wound on the stator teeth on a side of the inner rotor, the inner armature coil group being energized to drive the inner rotor; and
an outer armature coil group including a plurality of outer armature coils wound on the stator teeth on a side of the outer rotor, the outer armature coil group being energized to drive the outer rotor;
the inner armature coil group and the outer armature coil group having electric connections between the plurality of inner armature coils and between the plurality of outer armature coils so as to prevent occurrence of magnetic interference between the inner armature coil group and the outer armature coil group, respectively,
wherein the inner rotor has three pole pairs and the outer rotor has six pole pairs, and
wherein the plurality of outer armature coils have a same winding direction, the plurality of inner armature coils including inner armature coils having one winding direction and inner armature coils having an opposite winding direction which are circumferentially alternately arranged.

10. The electric rotating machine as claimed in claim 9, wherein the outer armature coil group has an electric connection in which a direction of voltage induced in one of the plurality of outer armature coils by magnetic flux generated in one of the plurality of inner armature coils is reverse to a direction of the voltage induced in another of the plurality of outer armature coils which is connected with the one of the plurality of outer armature coils, by magnetic flux generated in another of the plurality of inner armature coils which is connected with the one of the plurality of inner armature coils, and wherein the inner armature coil group has an electric connection in which a direction of voltage induced in the one of the plurality of inner armature coils by magnetic flux generated in the one of the plurality of outer armature coils is reverse to a direction of the voltage induced in the another of the plurality of inner armature coils which is connected with the one of the plurality of inner armature coils, by magnetic flux generated in the another of the plurality of outer armature coils which is connected with the one of the plurality of outer armature coils.

11. The electric rotating machine as claimed claim 9, wherein the plurality of inner armature coils includes a plurality of pairs of inner armature coils connected with each other, and each pair of inner armature coils being different by 180° in electrical angle from each other and supplied with a same phase current.

12. The electric rotating machine as claimed in claim 9, further comprising two three-phase inverters for independently driving the inner rotor and the outer rotor.

13. The electric rotating machine as claimed in claim 9, wherein each of the plurality of inner armature coils has a number of turns larger than that of each of the plurality of outer armature coils.

14. The electric rotating machine as claimed in claim 9, wherein the plurality of inner armature coils and the plurality of outer armature coils are supplied with a polyphase alternating current, respectively.

15. The electric rotating machine as claimed in claim 9, wherein the plurality of inner armature coils and the plurality of outer armature coils are supplied with a three-phase alternating current, respectively.

* * * * *